(12) United States Patent
Lutgen et al.

(10) Patent No.: US 7,301,897 B2
(45) Date of Patent: Nov. 27, 2007

(54) METHOD AND APPARATUS FOR MANAGING CONGESTION IN A DATA COMMUNICATION NETWORK

(75) Inventors: Craig L. Lutgen, Richardson, TX (US); Dale E. Ray, Forth Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 398 days.

(21) Appl. No.: 09/999,118

(22) Filed: Nov. 30, 2001

(65) Prior Publication Data

US 2003/0103451 A1   Jun. 5, 2003

(51) Int. Cl.
*H04L 12/28* (2006.01)
(52) U.S. Cl. .............. 370/229; 370/252; 370/352; 370/412
(58) Field of Classification Search .......... 370/229, 370/230, 230.1, 231, 235, 235.1, 252, 310, 370/328, 335, 336, 337, 338, 342, 347, 414, 370/416, 417, 412
See application file for complete search history.

(56) References Cited

U.S. PATENT DOCUMENTS

| | | | | |
|---|---|---|---|---|
| 4,616,359 | A * | 10/1986 | Fontenot | 370/230 |
| 6,205,125 | B1 | 3/2001 | Proctor et al. | 370/328 |
| 6,247,058 | B1 | 6/2001 | Miller et al. | 709/234 |
| 6,272,131 | B1 * | 8/2001 | Ofek | 370/389 |
| 6,590,885 | B1 * | 7/2003 | Jorgensen | 370/338 |
| 6,594,270 | B1 * | 7/2003 | Drummond-Murray et al. | 370/412 |
| 6,622,925 | B2 * | 9/2003 | Carner et al. | 236/46 R |
| 6,643,612 | B1 * | 11/2003 | Lahat et al. | 702/186 |
| 6,738,381 | B1 * | 5/2004 | Agnevik et al. | 370/395.7 |
| 6,907,041 | B1 * | 6/2005 | Turner et al. | 370/412 |
| 2002/0091636 | A1 * | 7/2002 | Bullard et al. | 705/40 |
| 2003/0023733 | A1 * | 1/2003 | Lingafelt et al. | 709/229 |
| 2004/0213248 | A1 * | 10/2004 | Okuda et al. | 370/395.1 |

FOREIGN PATENT DOCUMENTS

EP   0 912 015 A2   4/1999
WO   WO-01/38983 A2   5/2001

OTHER PUBLICATIONS

Yang et al., *A Taxonomy for Congestion Control Algorithms in Packet Switching Networks*, IEEE Network, No. 4, Jul./Aug. 1995, pp. 34-45.
International Search Report PCT/US02/34476 dated Apr. 28, 2003.

* cited by examiner

*Primary Examiner*—Chi Pham
*Assistant Examiner*—Shick Hom

(57) ABSTRACT

A method for managing data congestion and/or contention occurring at a point-of-traffic concentration. The method includes reading a time value associated with a data packet, the time value being representative of when the data packet entered the network. The time value is within the header of the data packet. The age of the data packet is determined from the time value. The data packet is discarded if the age of the data packet is above a threshold value. Alternatively, a first time value determined from a time reference is associated with a data packet at a first node. The data packet is transmitted to a second node and the first time value is compared to a second time value to provide a result. The second time value is also determined from the time reference. The data packet is discarded if the result exceeds a threshold value.

19 Claims, 4 Drawing Sheets

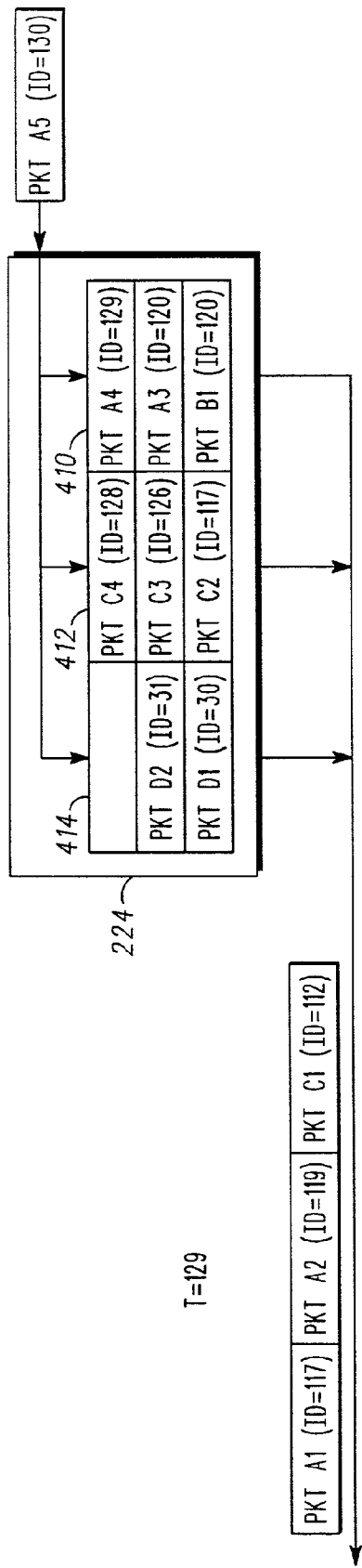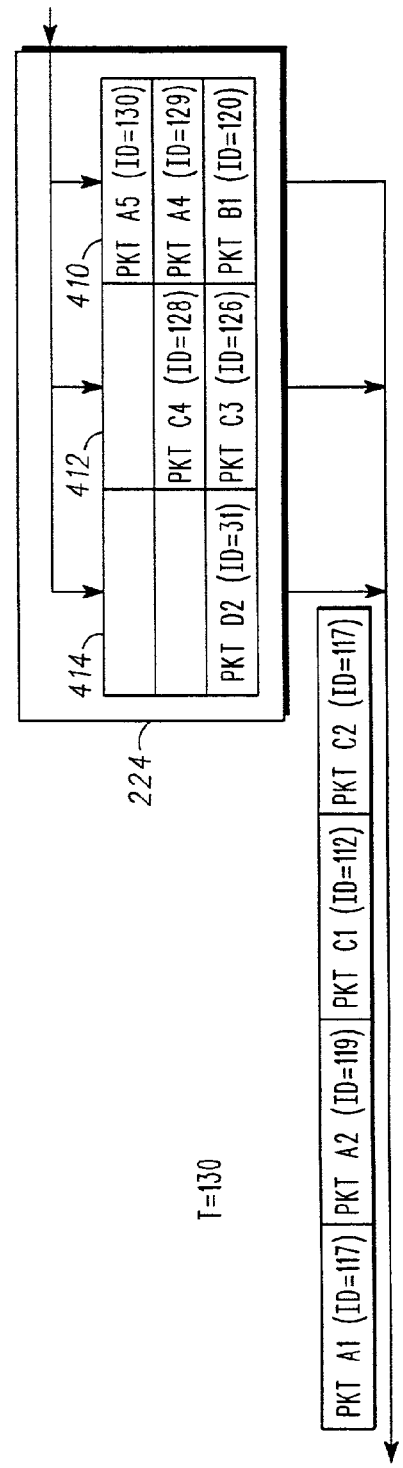

METHOD AND APPARATUS FOR MANAGING CONGESTION IN A DATA COMMUNICATION NETWORK

TECHNICAL FIELD

The present invention relates generally to communication systems, and more particularly to a method and apparatus for preventing and correcting datagram congestion and contention at point-of-traffic concentrations in a communication system.

BACKGROUND OF THE ART

Virtually any network communication system must deal with contention or possibly congestion of data traffic. For example, local area networks (LANs) that utilize point-of-traffic concentration may experience contention and congestion when receiving data from multiple sources (i.e., ingress sources) attempting to be transmitted (i.e., egress) through a single port or over a single line. Each line has bandwidth limitations on the amount of throughput that it can handle. Much of the data may be time-sensitive such that the data may have hard real-time or near real-time deadlines. That is, the data becomes old and unuseable in a matter of just 10's to 1000's of microseconds. Additionally, any network supporting connectionless message routing must account for autonomous removal of messages that erroneously do not have a destination (e.g., messages indefinitely circulating the network).

As a further example, some cellular systems utilize common base transceiver station platforms (CBTSP) to handle user-plane traffic (i.e., voice transmissions, video transmissions, near real-time data transfers, non-real-time data transfers, etc.) for transmission through backhaul interfaces. These CBTSPs are generally closed LANs. Since much of this user-plane traffic is real-time data, it becomes useless if it is not delivered within just a matter of microseconds. Therefore, if the user-plane traffic encounters congestion or contention with other data, it may become useless.

User-plane traffic may be received concurrently from multiple sources, such as mobile stations. Internet Protocol (IP) datagrams are used within the CBTSP to transport the user-plane traffic. Generally, Internet Protocol version 4 (IPv4) datagrams are used. This protocol is used for inter-network datagram routing, maximum transmission unit (MTU) fragmentation support, and datagram aging. In short, the IPv4 datagram is used to indicate the destination node and carry the data from the source to the destination. While IPv4 is being phased out of Internet communications in favor of IPv6 due to addressing limitations, it remains sufficient for addressing nodes within a closed LAN.

The CBTSP further utilizes a concentrator hub (i.e., switch) to receive the user-plane traffic from multiple points of ingress and consolidate the user-plane traffic at a single point in the LAN for conversion and transport over a backhaul interface. The connections within the internal LAN may be on the order of 100 megabits per second (Mbps), whereas the connection to the backhaul may be only 1½-2 Mbps. Thus, not only is the data being transmitted through fewer points of egress as compared to the number of point of ingress, there are increased bandwidth limitations at the points of egress.

While the common BTS platform performs data compression techniques to accommodate the backhaul interface and the bandwidth limitations, congestion and contention may still occur at the points of egress thereby acting as a point-of-traffic concentration. Furthermore, because this system is used to transport real-time or near real-time user-plane traffic, the network is quite sensitive to transmission delays. In fact, datagrams older than one air-frame time (e.g., 10 msec) are typically useless. Therefore, the congestion management solution must address datagram aging in the resolution of sub-milliseconds.

The conventional approaches to the congestion management and aging problems include: 1) manage congestion and contention reactively by overflowing the data queues at the point-of-traffic concentration and discarding datagrams, 2) autonomously remove datagrams through an aging algorithm using an 8-bit Time-To-Live (TTL) field inherent in the IP datagram header, and 3) increasing the buffer memory at point-of-traffic concentrations and/or increasing the number of connections with the backhaul. The first approach is a reactive process of discarding datagrams due to queue overflow. Resource reservation protocols, such as RSVP, are used to reserve certain quantities of resources to avoid congestion. These protocols could be used to reserve memory/buffer requirements to insure that congestion is avoided. However, this increases the complexity of the protocol used to carry high volume user-plane traffic. Moreover, the datagrams are discarded without regard to their validity, such that datagrams that are still useful are discarded and other datagrams that may be useless could be left in the queue.

Using the second approach, the TTL field specifies the time, in integral number of seconds, that the datagram can live in the network. As it is difficult to measure time relative to the datagram's time of entry into a distributed network, this TTL interpretation is often simplified to a hop-count where each hop from node to node is assumed to take 1 second. An algorithm reads the TTL field to determine how long the datagram has been in the network. By default, the TTL field allows a datagram to remain in the network for up to 255 seconds or 255 hop-counts. The disadvantages of using the TTL field are: 1) the resolution is only in seconds, since the IPv4 standard was not initially intended to deliver real-time data, 2) precision is accurate only to the processing delay of each hop, and 3) synchronization throughout the network to the datagram's time-of-entry is not achieved which is generally required for monitoring the age of the datagram within the LAN. As mentioned, user-plane traffic includes real-time or near real-time data that can become useless in just a matter of microseconds. Therefore, the typical TTL field, which is not even accurate to 1 second, cannot be used.

The third approach provides the easiest work-around solution to congestion avoidance by increasing memory and/or increasing the number of connections to the backhaul in order to increase the bandwidth. However, this is costly to implement, it does not account for microsecond time resolution, and the TTL field is still used as the aging mechanism. It also does not address time synchronization between distributed nodes. Furthermore, many systems incur a per-connection cost on the number of connections to the backhaul.

Thus there is a need for a method and apparatus that efficiently manages congestion and contention in a network carrying time-sensitive data with microsecond resolution. There is also a need for a method and apparatus that intelligently discards old data while continuing to minimize buffer size and the number of backhaul connections in order to minimize costs.

BRIEF DESCRIPTION OF THE DRAWINGS

FIG. 5 is a representation of a node with data queues receiving a data packet in accordance with the preferred embodiments of the present invention.

FIG. 6 is a representation of node of FIG. 5 having discarded data packets in accordance with the preferred embodiments of the present invention.

DESCRIPTION OF THE PREFERRED EMBODIMENTS

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the Enhanced Data-rate for GSM Evolution (EDGE), Frequency Division Multiple Access (FDMA), the IS-55 Time Division Multiple Access (TDMA) digital cellular, the IS-95 Code Division Multiple Access (CDMA) digital cellular, demand assignment schemes (DA/TDMA, DA/CDMA, DA/FDMA), the Wideband Code Division Multiple Access (WCDMA), CDMA 2000, the Personal Communications System (PCS), 3G, 3GPP, the Universal Mobile Telecommunications System (UMTS) and variations and evolutions of these protocols. The communication system of the present invention is further directed to any high capacity, high bandwidth communication network or any IP network that carries hard, time-sensitive data and where delayed data (i.e., ones that miss the hard, real-time deadlines) become useless.

Figure 1:
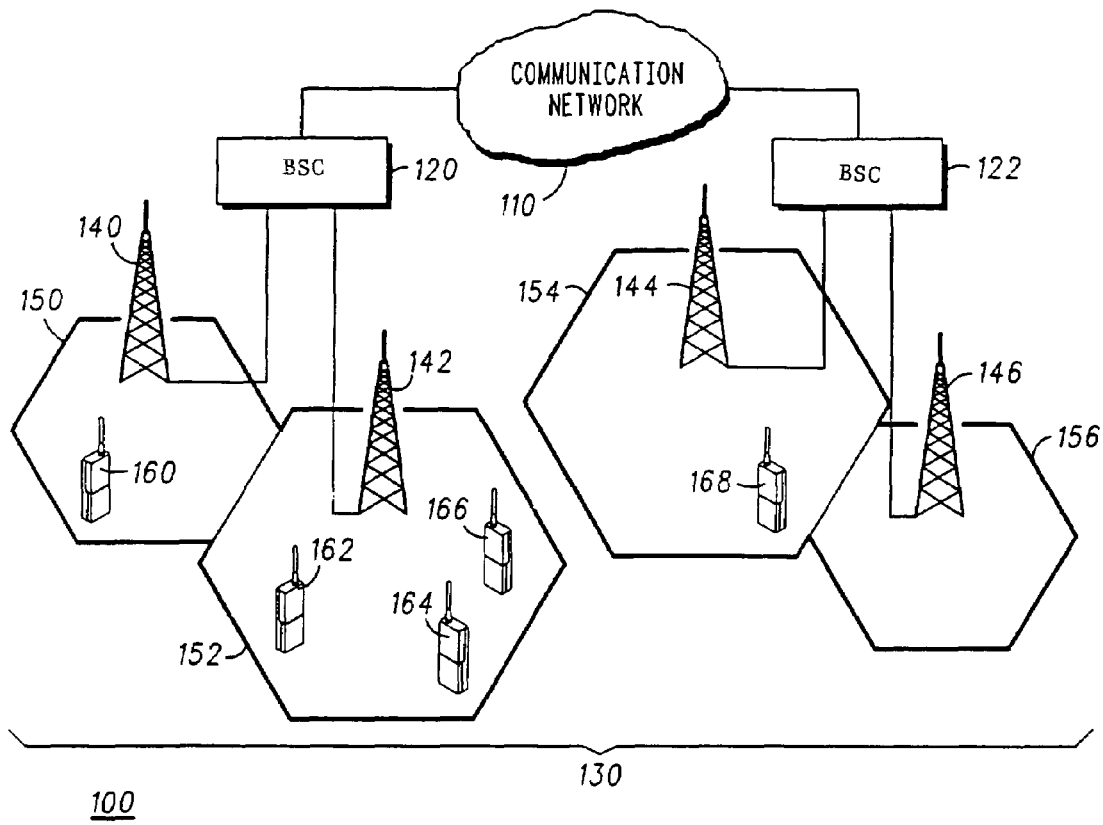
FIG. 1 is a block diagram representation of a wireless communication system that may be adapted to operate in accordance with the preferred embodiments of the present invention.

Referring to FIG. 1, a wireless communication system 100 includes a communication network 110, a plurality of base station controllers (BSC), generally shown as 120 and 122, servicing a total service area 130. The BSCs generally handle signal (de)compression, handoff determinations, and the signal access determinations. Each BSC may also act as a switch and network interface (i.e., backhaul interface). The wireless communication system 100 may be, but is not limited to, a frequency division multiple access (FDMA) based communication system, a time division multiple access (TDMA) based communication system, or a code division multiple access (CDMA) based communication system. As is known for such systems, each BSC 120 and 122 has associated therewith one or more base transceiver stations (BTS), generally shown as 140, 142, 144, and 146, servicing communication cells, generally shown as 150, 152, 154, and 156, within the total service area 130. The BSCs 120 and 122, and base transceiver stations 140, 142, 144, and 146 are specified and operate in accordance with the applicable standard or standards for providing wireless communication services to mobile stations (MS), generally shown as 160, 162, 164, 166, and 168, operating in communication cells 150, 152, 154, and 156, and each of these elements are commercially available from Motorola, Inc. of Schaumburg, Ill.

As seen in FIG. 1, a single BTS 142 may service multiple mobile stations 162, 164, 166 within its cell 152. The BTS 142 maintains a connection with the BSC 120, which in turn services multiple base transceiver stations 140 and 142 while maintaining a connection with the backhaul (not shown) residing within the communication network 110. Alternatively, the BSC 120 may be located at the site of the BTS 142. The backhaul may include a mobile switching center (MSC) and a central office. Alternatively from the point of view of the BTS 142, the backhaul would include the BSC 120. It can be seen from FIG. 1 that there may be several point-of-traffic concentrations within the communication system 100. For example, at the BSC 120 data from base transceiver stations 140, 142 is communicated to the communication network 110 over a single line.

Furthermore, these point-of-traffic concentrations occur both upstream and downstream, thereby creating several point-of-traffic concentrations throughout the communication system 100, including its various levels and in both directions of user-plane traffic. For example, a central office may receive data from multiple BSCs 120, 122 to be transmitted through a single port of egress to another BSC. In yet another example, a single BSC 120 may receive data from multiple base transceiver stations 140, 142, to be transmitted over a backhaul to a central office. While the invention is applicable to any point-of-traffic concentration, for ease of explanation the invention will only be described with reference to a single BTS 142 servicing multiple mobile stations 162, 164, 166 with a backhaul connection to the BSC 120 though one skilled in the art will recognize the present invention's application to any point in a network.

Figure 2:
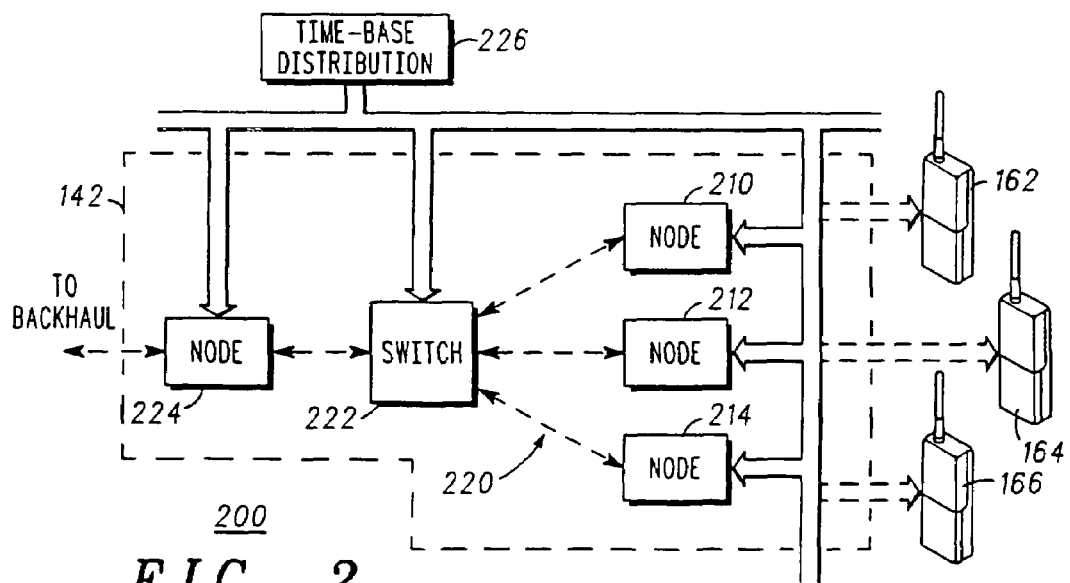
FIG. 2 is a block diagram representation of a network of multiple nodes that may be adapted to operate in accordance with the preferred embodiments of the present invention.

FIG. 2 is a representation of a network 200, which may be any kind of network having front end nodes 210, 212, 214 transferring data over a closed LAN 220 and through a switch 222 to a backend node 224. Referring to FIG. 2, the BTS 142 may include multiple transmitting/receiving nodes 210, 212, 214. Each of the nodes 210, 212, 214 may maintain a connection with a mobile station 162, 164, 166 within the cell 152. The nodes 210, 212, 214 further act as radio transceivers that perform analog-to-digital conversions. A radio-frequency (RF) signal is received from the mobile stations 162, 164, 166 and converted to a digital signal in the form of one or more IPv4 datagrams for use over the closed LAN 220. The RF signals include any kind of user-plane traffic, including: 1) voice transmissions, 2) video transmissions, 3) near real-time file transfers, and 4) non-real-time file transfers. The order of the above data types indicates its time sensitivity. That is, voice data is more time-sensitive than video data, near real-time data is less susceptible to delays than voice or video data, and non-real-time file transfers are considered the least susceptible to transmission delays.

The BSC 120 is in the backhaul and is in communication with the BTS 142 via the backhaul interface. The BTS 142 includes a standard ethernet switch 222 that receives and transmits data to the nodes 210, 212, 214 through the LAN 220. The LAN connection may be on the order of 100's of megabits per second (Mbps). The ethernet switch 222 is further coupled to a backend node 224 which acts as an interface with the backhaul. The BTS 142 usually has only one or a few connections to the backhaul, which are generally less than the number of front end connections to the mobile stations 162, 164, 166. The connection with the backhaul may be via a land-line or a wireless connection. The transmission rate may be on the order of 1½-2 Mbps. The backend node 224 maintains one or more priority queues that buffer all the incoming datagrams for transmission to the backhaul.

All nodes within the network 200 are in communication with a clock or other time-base distribution system 226. The time-base distribution system 226 has microsecond resolution and distributes an out-of-band time reference to all points within the network 200. The time-base distribution may be implemented as a simple timing pulse that is typically used for clock distribution in digital systems. Often, such a clock will already exist in cellular communications systems since other aspects of the communications system 100 rely on clocks with microsecond resolution. The present invention extends the use of the time-base to timestamping datagrams in the datagram header. While a preferred embodiment of the present invention will be described as having microsecond resolution, other resolutions are also applicable and may be dependent on the time sensitivity of the datagram. For example, some types of datagrams may remain solid for 100's of microseconds so a time-base or clock having only resolution in 100's of microseconds may be required. Other datagrams may only remain valid for sub-microseconds, so the time reference may have sub-microsecond resolution. The resolution of the time reference is therefore not limited to microseconds and other resolutions may be used with the present invention.

Figure 3:
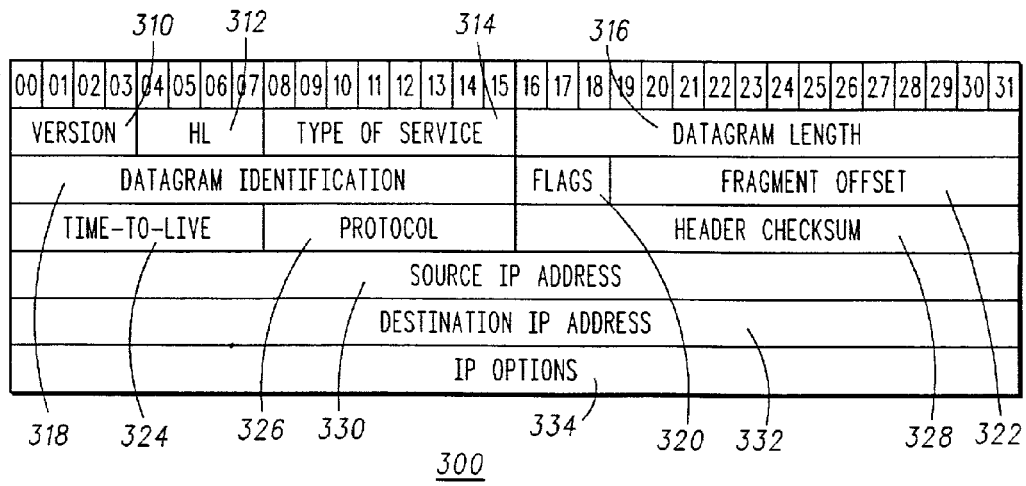
FIG. 3 is a representation of a header of a data packet that may be adapted to operate in accordance with the preferred embodiments of the present invention.

FIG. 3 depicts the standard fields of the IPv4 datagram header 300. While various protocols may be used with the present invention, IPv4 is currently used for transporting data within cellular communication networks, and it is expected that IPv4 will remain suitable for most closed networks. Therefore, IPv4 will be used to illustrate the invention, though this should not be construed as limiting the invention to IPv4 or any other version of the IP protocol.

Each IPv4 datagram header 300 generally consists of fields that may include: a 4-bit Version 310, a 4-bit Header Length 312, an 8-bit Type of Service field 314, a 16-bit Datagram Length 316, a 16-bit Datagram Identification (ID) 318, 3-bit Flags 320, a 13-bit Fragment Offset 322, an 8-bit Time-to-Live (TTL) indicator 324, an 8-bit Protocol 326, a 16-bit Header Checksum 328, a 32-bit Source IP Address 330, a 32-bit Destination IP Address 332, and IP Options 334.

The Datagram Identification 318 will be described in further detail below. The remaining fields are described briefly as follows. The Version field 310 tracks which version of the protocol belongs to the datagram. The Header Length 312 specifies the length of the IP header since the header length is not always constant. The Type of Service field specifies the parameters for the type of service requested (e.g., precedence, minimize delay, maximize throughput, etc.). The Datagram Length 316 contains the total length of the datagram, including the header and the data. The Flags 320 are used to control and manage the fragmentation process. The Fragment Offset 322 is used to direct the reassembly of a fragmented datagram. The Time-To-Live field 310 was described above as a counter incrementing in either seconds or in hop-counts. The Protocol 326 specifies the next encapsulated protocol (e.g., IPv6 Hop-by-Hop Option, Internet Control Message Protocol, Internet Group Multicast Protocol, RSVP Reservation Protocol, etc.). The Checksum 328 verifies the header by detecting errors using a one's complement of the IP header and the IP options. The Source IP Address 330 is the IP address of the sender. The Destination IP Address 332 is the IP address of the intended receiver. The IP Options 334 may relate to security, strict or loose source routing, record route and timestamping.

The timestamp of the IP Options 334 is a right-justified, 32-bit timestamp measured in milliseconds since midnight UT. If time relative to midnight UT is not available, or time is not available in milliseconds, then any time may be inserted as a timestamp. The timestamp makes each router append its address and timestamp to the IP Options field 334. (See Internet Protocol RFC 791, September 1981, pp. 22-23). However, the IP Options 334 are rarely used or supported in existing software stacks since there is virtually no application for the timestamp in the IP Options field 334. Therefore, as a practical matter, the timestamp of the IP Options 334 cannot be used in existing networks nor does the timestamp of the IP Options 334 aid in managing data congestion and contention. Furthermore, the timestamp option is not copied onto each fragment when the datagram undergoes fragmentation. The timestamp is only carried in the first fragment and not in succeeding fragments of the datagram. Thus, the timestamp of the IP Options field 334 does not fully survive the fragmentation process.

The Datagram Identification (ID) field 318 in the IPv4 header is generally an arbitrary and unique value that has the appearance of being assigned a random value. Datagram fragmentation is often necessary since not all parts of a network or system are able to handle datagrams of the same size. Thus, some datagrams are too large for the network to handle and the datagram needs to be fragmented to be transmitted and reassembled at the destination. The ID field 318 is used to allow the destination host to determine which datagram is associated with a received fragment. Typically this is a monotonically increasing sequence number inserted by the datagram transmitter. Without the ID 318, the destination host would be unable to reassemble the entire datagram.

If not all the fragments of a datagram reach the destination node, the destination node will attempt to assemble the datagram as much as possible and will wait a certain period of time for the delayed fragment(s) to arrive to complete the assembly. If the delayed fragment(s) do not arrive within a specified time, the destination node will discard the other fragments since the datagram is useless without all the fragments. Furthermore, as mentioned above, datagrams older than a matter of microseconds may be useless at the destination node.

In a preferred embodiment of the present invention, instead of monotonically increasing the ID field for each datagram or assigning a random value to the datagram, the ID field 318 is assigned a timestamp value. The timestamp value does not necessarily need to be with reference to the actual time of day, but rather just a time-reference with respect to the time-base distribution system 226. The timestamp of the present invention may be the actual time as read from the time-base distribution system 226, or the timestamp may be the time-reference plus an allowable lifespan of the datagram ($T+T_{MAX}$), such that the receiving node need only compare the Datagram Identification value to the current time to determine if the datagram is valid. The datagram is then fragmented and transmitted. The timestamp acts as the identification for reassembling the datagram from the fragments at the destination host. This approach maintains complete compliance with the IP specification. The traditional use of the Datagram Identification 318 for datagram fragmentation and reassembly continues to be valid. While more than one datagram may have the same timestamp, other aspects of the datagram header 300 are able to distinguish two or more fragments having the same timestamp from each other. For example, the identification is generally only significant at the destination host when the datagram is reassembled. Thus, fragments with different Destination IP Addresses 332 distinguish the datagrams. Even if both datagrams are directed to the same destination host, they may be from different sources and therefore have different Source IP Addresses. Other methods of differentiation are available, as is known in the art.

Figure 4:
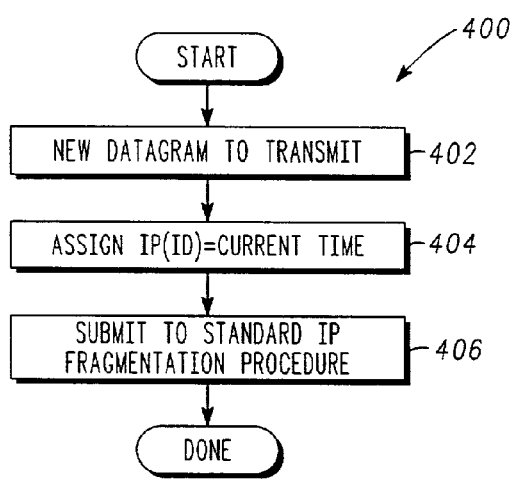
FIG. 4 is a flow diagram illustrating a method for timestamping a datagram in accordance with the preferred embodiments of the present invention.

FIG. 4 depicts a simple timestamping algorithm 400 for applying the timestamp. Preferably, this algorithm 400 is implemented at any point of entry in the network. In the present example, this would occur at the front end nodes 210, 212, 214. At block 402, a node is preparing to transmit a datagram. At block 404, the node reads the time reference from the time-base distribution system 226 and assigns a timestamp to the IP field 318 of the IP header 300. The timestamp will act as the identification of the datagram for purposes of fragmentation. The timestamp references when the datagram is sent into the network, thus associating the datagram with a time-of-entry having microsecond resolution or any other resolution suitable for determining the validity of the datagram. The datagram is then submitted to the standard IP fragmentation procedure at block 406, as is known in the art.

FIGS. 5 and 6 depict the process of receiving and intelligently analyzing each datagram to determine if the datagram has become useless and can be discarded. Preferably, this is determined at the backend node 224 by analyzing the data queues. In FIG. 5, several datagrams are shown. Each datagram is categorically grouped 'A,' 'B,' 'C,' and 'D,' wherein each category may represent different types of data. For example, voice data may be transmitted in the 'A' datagrams, video data may be the 'B' datagrams, near real-time data may be the 'C' datagrams, and non-real-time data may be the 'D' datagrams. As mentioned, the usefulness of the datagram given its age is dependent on the type of data it is carrying. Therefore, the 'A' datagrams may be given the shortest lifespan, with the 'D' datagrams being given the longest possible lifespan. Alternatively, each category may each represent a separate datastream from each node 210, 212, 214.

Each node within the network 200, or even the overall communications system 100, has knowledge of the current time from the time-base distribution system 226, and further has knowledge of what the permitted lifespan is of a particular type of datagram. For example, all voice datagrams may be given a lifespan of only 10 microseconds ($T_{MAX}$=10), since after 10 microseconds the datagram can no longer be used. Video datagrams may have a slightly higher lifespan of 15 microseconds ($T_{MAX}$=15), and near real-time datagrams may have a lifespan of 20 microseconds ($T_{MAX}$=20). Non-real-time datagrams may be given a lifespan 100 microseconds or more ($T_{MAX}$=100) since this datagram is valid for longer periods of time. The actual threshold values may be varied or specified based on what is deemed necessary or desirable. For example, to simplify the system each datagram may be given a lifespan of $T_{MAX}$=10 regardless of its type. Alternatively, the lifespan may vary as a function of the amount of traffic being handled within a particular serving area 130, a particular cell 150, 152, 154, 156, a particular BTS 140, 142, 144, 146 or BSC 120, 122 such that a heavier concentration of traffic warrants shorter lifespans than with a lighter concentration of traffic.

Each datagram is received by the node 224 at the point of enqueing a new datagram (i.e., ingress). The node 224 may have multiple priority queues 410, 412, 414 in which to temporarily store each datagram until the datagram can be transmitted to the backhaul. The queue to which a particular datagram is assigned may be dependent on the priority of the datagram. For example, voice and video datagrams may have more priority than near real-time or non-real-time datagrams. Queue 410 may act as the priority 'A/B' queue to hold voice and video datagrams, such that the system will look to the 'A/B' queue 410 first for a datagram rather than the priority 'C' queue 412 which may hold the near real-time datagrams. The priority 'D' queue 414 may then hold the non-real-time datagrams which have the lowest priority. Alternatively, each queue 410, 412, 414 may be reserved for each of the nodes 210, 212, 214.

As can be seen in FIGS. 5 and 6, each datagram has been encoded with a timestamp in the ID field 318. In FIG. 5, the current time is T=129 and at this point in time all the received datagrams are enqueued in the three queues 410, 412, 414. The 'A/B' and 'C' queues are full which indicates that congestion is imminent. The 'A/B' queue 410 is also poised to have contention between incoming datagram 'A5' and datagrams already in the queue 410. The alloted lifespan of the 'A' datagrams is T=10, so at T=130 any 'A' datagram having a timestamp of ID=120 or earlier is deemed useless and will be discarded. 'B' datagrams with ID=115 or less, 'C' datagrams timestamped with ID=110 or less, and 'D' datagrams with ID=30 or less will all be discarded at T=130. At T=129, all the datagrams in FIG. 5 are still valid. Datagrams 'A1,' 'A2' and 'B1' have been recently dequeued are and being transmitted through the interface to the backhaul.

Each time a datagram is about to be enqueued, the procedure examines all datagrams within the queues 410, 412, 414 if the datagrams are being added arbitrarily, or just the queue that the datagram is intended for is examined. By scanning the ID field of each datagram, knowing the current time, and knowing the allowable lifespan of a datagram, a node is able to intelligently discard datagrams based on their usefulness (i.e., based on their age) prior to attempting to enqueue the new datagram.

In FIG. 6, the current time is t=130 and datagram 'A5' is about to be enqueued. The node 224 examines all the datagrams in the 'A/B' queue 410 and determines that datagram 'A3' has a timestamp of 120. Datagram 'A3' has aged as a result of the 'A/B' queue being close to congestion at the same time datagram 'A5' was being received. Therefore, datagram 'A3' was discarded, since it was older than 10 microseconds and therefore no longer useful even if it were transmitted. Datagram 'A5' was then received into the 'A/B' queue 410. In this manner, contention within the 'A/B' queue 410 was managed and congestion was preempted. It should be noted that even though datagram 'B1' also has a timestamp of ID=120, datagram 'B1' is a video datagram which is allowed to have a longer lifespan. According to the present example, when the time is T=135 and datagram 'B1' remains in the 'A/B' queue 410, it too will be discarded.

Since the timestamping nodes 210, 212, 214 and the receiving node 224 are all synchronized to the same time-base distribution system 226, the network 200 is able to intelligently and accurately discard invalid datagrams as part of its overall congestion and contention management, allowing other time-sensitive data to remain valid. The process is also proactive as opposed to reactive by having an accurate, time-base reference having microsecond resolution distributed throughout the LAN. The datagram is still able to undergo successful fragmentation and reassembly since the Datagram Identification 318 may still be used as usual. The extended meaning of the Datagram Identification 318 also means that minimal additional processing is required since further protocol layers are not necessary nor do further protocol layers need to be modified. As a result, all intermediate and other network equipment can operate transparently to this invention, and the communication system 100 is not slowed down or otherwise disrupted. Furthermore, existing hardware may still be used without the addition of extra lines of communication with the backhaul, increased buffer memory or modifications to the software stacks to support an extra field such as the timestamp of the IP Options 334.

In addition, the Datagram Identification field 318 is repeated for each fragment of a datagram that has undergone the fragmentation process. Therefore, the timestamp of the present invention is contained in each data fragment, unlike the timestamp of the IP Options field 334 which occurs only in the first fragment. This allows the congestion and contention management to be applied not only to whole datagrams, but also to each datagram fragment. This process can further be applied at the destination node. For example, if a datagram is fragmented and one of the fragments is discarded in accordance with the above process, that fragment will never reach the destination node. The other fragments may reach the destination node before they are deemed useless, thereby surviving the congestion/contention management process. However, the surviving fragments that reach the destination node will also be useless since the datagram cannot fully be reassembled, even though they were received before their allowable lifespan was reached. Rather than wait for a period of time to receive the lost fragment, the destination node may read the timestamp of the other fragments. The destination node may also be in communication with the time-base distribution system 226 and thus be able to determine the age of the entire datagram. Rather than wait for the arrival of the lost fragment or allowing a standard timeout period to expire, the destination node may simply wait for the lifespan of the datagram to expire and discard the remaining fragments without attempting to reassemble the data. This may end up being faster than the standard timeout period for waiting for the other fragment to arrive. Processing power and processing time is further saved by not attempting to reassemble the datagram that is incomplete.

Referring back to FIG. 6, while datagram 'A3' was being analyzed and discarded, the node 224 analyzed its other queues including the 'D' queue 414 even though it was not close to congestion or contention. Also during this time, the node 224 transmitted datagram 'C2' even though it had a timestamp older than 10 microseconds. Again, this is because the threshold set for 'C' datagrams (i.e., near real-time data) was 20 microseconds. All other datagrams in the 'C' queue 412 remain valid. When the 'D' queue 414 was scanned for invalid datagrams, the node 224 determined that datagram 'D1' (ID=30) had aged beyond its allowable lifetime of 100 microseconds. Datagram 'D1' was therefore discarded as well. In this manner, the node may perform regular maintenance whether or not congestion and/or contention is imminent.

An alternative approach would be to scan only the queue in which the new datagram is to be enqueued (e.g., the 'A/B' queue), and manage each queue on a case-by-case basis as necessary. Yet another approach would include discarding the newly received datagram before enqueing it, if the newly received datagram is deemed to be beyond its lifespan.

Figure 7:
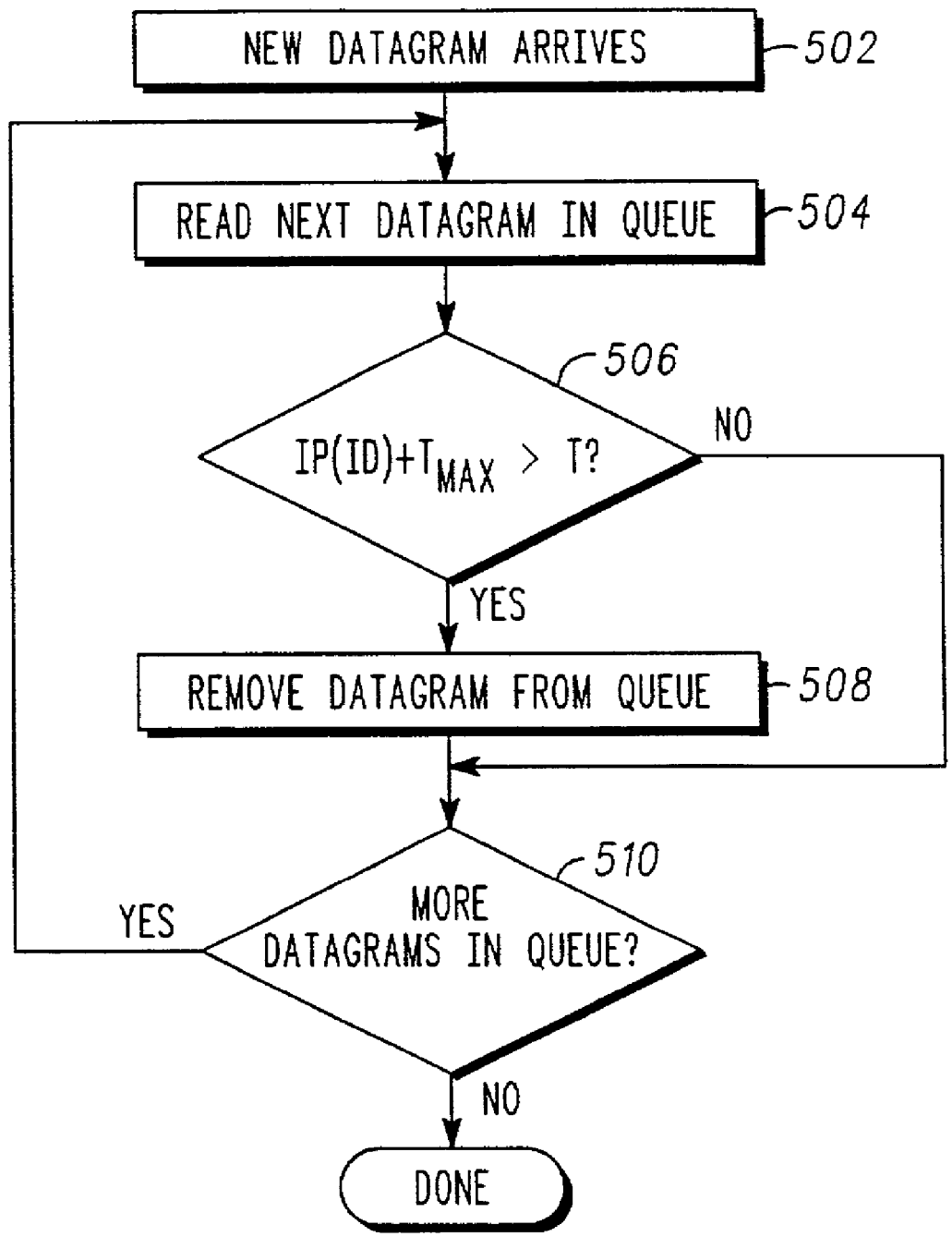
FIG. 7 is a flow diagram illustrating a method for managing data packets in a queue in accordance with the preferred embodiments of the present invention.

FIG. 7 depicts a simple algorithm that may be implemented in the receiving node 224 to analyze each datagram as it is received. However, as mention above, this procedure may be implemented at any point-of-traffic concentration, provided that the datagram has previously been timestamped, which is generally done at the point of entry into the network 200. At block 502 a new datagram arrives. The node 224 then reads the next datagram in the queue(s) at block 504 and reads the timestamp of the datagram in the ID field 318. At block 506, the node determines if the datagram is beyond its allowable lifespan by comparing the timestamp IP(ID) plus the allowable threshold ($T_{MAX}$) to the current time (T). If the sum of the timestamp and lifespan is equal to or greater than the current time, the datagram is determined to be useless and is discarded at block 508. If the datagram is still valid, the procedure 500 skips the removal process and determines if there are more datagrams remaining in the queue(s) at block 510. If yes, the next datagram in the queue is read and analyzed. If no datagrams remain, the process 500 is completed. Alternatively, the process of detecting invalid datagrams can be done in several ways including at the time of enqueing (ingress), time of dequeueing (egress), periodic scanning of queues, or any other method that is transparent to the communication system 100.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A method of managing data congestion and contention at a point-of-traffic concentration within a network, comprising:

reading a first time value within the header of an Internet Protocol datagram, wherein the first time value is representative of when the Internet Protocol datagram entered the network, wherein the Internet Protocol datagram includes a datagram identification portion, wherein the first time value is included in the datagram identification portion and at least partially distinguishes the Internet Protocol datagram from other Internet Protocol datagrams;

determining the age of the Internet Protocol datagram relative to the first time value; and discarding the Internet Protocol datagram if the age of the Internet Protocol datagram is above a threshold value.

2. The method as defined in claim 1, further comprising associating the first time value with the Internet Protocol datagram at a first node, wherein the first time value is determined at least in part from a time reference; and transmitting the Internet Protocol datagram to a second node, wherein determining the age of the Internet Protocol datagram comprises comparing the first time value to a second time value, the second time value determined at least in part from the time reference.

3. The method as defined in claim 2, wherein the first node a source of the Internet Protocol datagram, wherein the first time value is further representative of one of when the Internet Protocol datagram was created and a point of entry into the network.

4. The method as defined in claim 2, wherein the time reference has at least microsecond resolution.

5. The method as defined in claim 1, wherein the first time value is representative of when the Internet Protocol datagram entered the network plus the threshold value.

6. The method as defined in claim 1, wherein the threshold value is an allowable lifespan of the Internet Protocol datagram.

7. The method as defined in claim 1, wherein the Internet Protocol datagram comprises a plurality of data fragments, wherein each data fragment includes the first time value.

8. The method as defined in claim 1, wherein the threshold value is dependent upon at least one of a type of data transmitted within the Internet Protocol datagram and an amount of data traffic within the network.

9. A base station controller operatively coupled to a backhaul for transmitting an Internet Protocol datagram, the base station controller comprising:
   a communication link operatively coupled with a base transceiver station, the communication link adapted to receive an Internet Protocol datagram that includes a header having a datagram identification portion;
   a closed local area network;
   a timing element operatively coupled with the communication link, the time element adapted to provide a time reference;
   a time-stamping element operatively coupled to the communication link, the time-stamping element adapted to associate a time value representative of when the Internet Protocol datagram enters the closed local area network from the timing element into the header, wherein the time value is included in the datagram identification portion and at least partially distinguishes the Internet Protocol datagram from other Internet Protocol datagrams;
   a data queue adapted to temporarily store the Internet Protocol datagram prior to transmission to the backhaul; and
   a data management element adapted to read the time value from the datagram identification portion of the header, wherein the data management element is further adapted to discard Internet Protocol datagrams having a time value that exceeds an allowable threshold based at least in part on the time reference.

10. The base station controller as defined in claim 9, wherein a source of the Internet Protocol datagrams is one of the base transceiver station and the communication link operatively coupled with the base transceiver station.

11. The base station controller as defined in claim 9, wherein the time references are provided in intervals of at least microsecond resolution.

12. A base station controller as defined in claim 9, wherein the Internet Protocol datagrams comprise one of real-time voice data, real-time video data, near real-time data, and non-real-time data.

13. A base station controller as defined in claim 9, wherein the base station controller operates in accordance to one of a code division multiple access (CDMA) based communication system and a time division multiple access (TDMA) based communication system.

14. A base transceiver station configured to communicate with the one or more mobile stations, the base transceiver station comprising:
   a radio transceiver for receiving signals from the one or more mobile stations, wherein the radio transceiver provides Internet Protocol datagrams representing data from the one or more mobile stations, wherein each of the Internet Protocol datagrams includes a datagram identification portion in a header;
   a closed local area network;
   a communication link operatively coupled with a timing element, the communication link adapted to receive a time reference from the timing element;
   a time-stamping element operatively coupled to the radio transceiver, the time-stamping element adapted to associate a time value representative of when the Internet Protocol datagram enters the closed area network from the timing element into each header provided by the radio transceiver, wherein the time value is included in the datagram identification portion and at least partially distinguishes the Internet Protocol datagram from the other Internet Protocol datagrams;
   a data queue adapted to temporarily store the Internet Protocol datagrams prior to transmission to the base station controller; and
   a data management element adapted to read the time value from the datagram identification portion of the header, wherein the data management element is further adapted to discard Internet Protocol datagrams having a time value that exceeds an allowable threshold based at least in part on the time reference.

15. A base transceiver station as defined in claim 14, wherein a source of the Internet Protocol datagram is the radio transceiver.

16. A base transceiver station as defined in claim 14, wherein the Internet Protocol datagram comprise at least one of real-time voice data, real-time video data, near real-time data, and non-real-time data.

17. The base transceiver station as defined in claim 14, wherein the base transceiver station operates in accordance to one of a code division multiple access (CDMA) based communication system and a time division multiple access (TDMA) based communication system.

18. A method of managing a plurality of fragments of an Internet Protocol datagram at an intended destination of the Internet Protocol datagram, the method comprising:
   receiving a first one of the plurality of fragments and a time value associated therewith, the time value being common to each of the plurality of fragments, wherein the Internet Protocol datagram includes a datagram identification portion, wherein the datagram identification portion is present in each of the plurality of fragments, wherein the time value is included in the datagram identification portion of each of the plurality of fragments;
   reading a time value;
   determining an age of the Internet Protocol datagram based on the time value; and
   discarding the first one of the plurality of fragments if not all of the plurality of fragments of the Internet Protocol datagram have been received within a predefined time threshold, wherein the predefined time threshold is based at least in part on the age of the Internet Protocol datagram.

19. The method as defined by claim 18, wherein the intended destination is a mobile station.

* * * * *